US009246424B2

(12) United States Patent
Jain et al.

(10) Patent No.: US 9,246,424 B2
(45) Date of Patent: Jan. 26, 2016

(54) DYNAMIC MIXED-MODE CURRENT DECAY APPARATUS AND METHODS

(71) Applicant: TEXAS INSTRUMENTS INCORPORATED, Dallas, TX (US)

(72) Inventors: Anuj Jain, Irving, TX (US); Mario Marascutti, Fontanafredda (IT); Wenchao Qu, Dallas, TX (US); Michael Edwin Butenhoff, Minnesota City, MN (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 113 days.

(21) Appl. No.: 14/222,865

(22) Filed: Mar. 24, 2014

(65) Prior Publication Data
US 2015/0015177 A1  Jan. 15, 2015

Related U.S. Application Data

(60) Provisional application No. 61/844,759, filed on Jul. 10, 2013.

(51) Int. Cl.
*H02P 8/00* (2006.01)
*H02P 8/12* (2006.01)
(52) U.S. Cl.
CPC .......................................... *H02P 8/12* (2013.01)
(58) Field of Classification Search
CPC ........... H02M 3/157; H02P 23/14; H02P 8/12
USPC ............. 318/696, 599, 621, 685, 400.29, 293
See application file for complete search history.

(56) References Cited

U.S. PATENT DOCUMENTS

| 4,581,565 | A | * | 4/1986 | Van Pelt | H02P 7/0044 318/294 |
| 5,982,134 | A | * | 11/1999 | Tanaka | H02P 8/22 318/685 |
| 6,911,800 | B2 | * | 6/2005 | Kobayashi | G05B 19/40 318/560 |
| 7,615,961 | B2 | * | 11/2009 | Kobayashi | G05B 19/40 318/567 |
| 8,129,934 | B2 | * | 3/2012 | Ando | H02P 8/22 318/685 |
| 8,564,230 | B2 | | 10/2013 | Dwersteg | |

* cited by examiner

*Primary Examiner* — Bentsu Ro
*Assistant Examiner* — Thai Dinh
(74) *Attorney, Agent, or Firm* — Lawrence J. Bassuk; Frank D. Cimino

(57) ABSTRACT

Stepper motor winding current regulation methods and apparatus continuously and bi-directionally sense winding current to determine both the magnitude of the winding current and the slope of a waveform representing the winding current. The magnitude and slope information is used to more precisely control periods of current rise and characteristics of fast and slow current decay during pulse-width modulation ("PWM") regulation cycles. Winding current rise and decay shaping is based upon the sensed magnitude of the winding current, the magnitude of the winding current regulation setpoint ITRIP, whether the sensed winding current is greater than or less than ITRIP at a selected sampling time, whether the sensed winding current is increasing or decreasing when a waveform of the sensed winding current crosses over ITRIP, and whether or not the magnitude of ITRIP changes during a PWM cycle in response to a receipt of a subsequent DAC code.

20 Claims, 7 Drawing Sheets

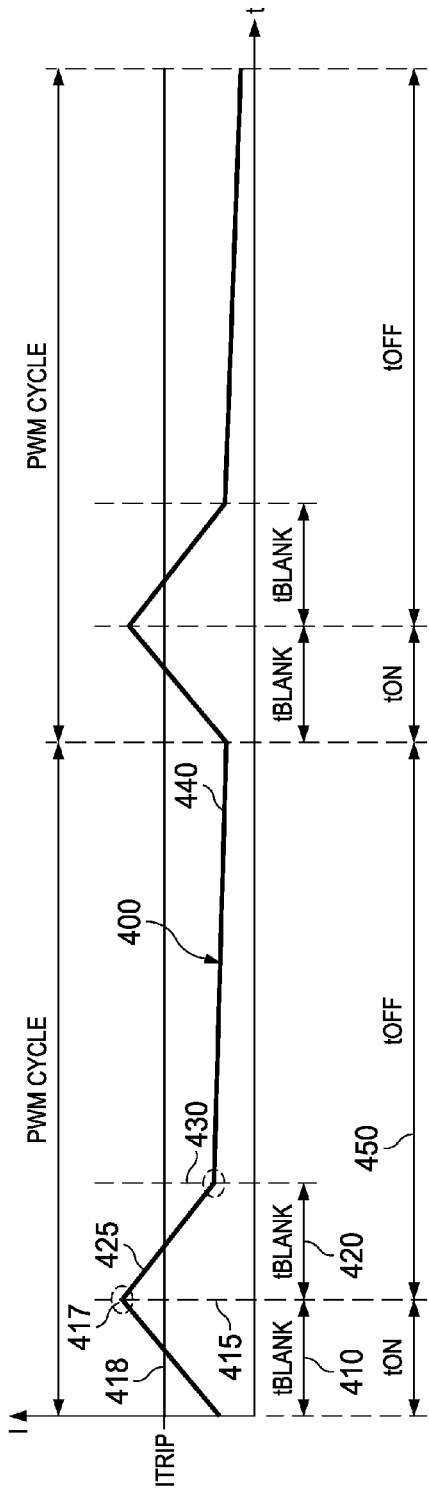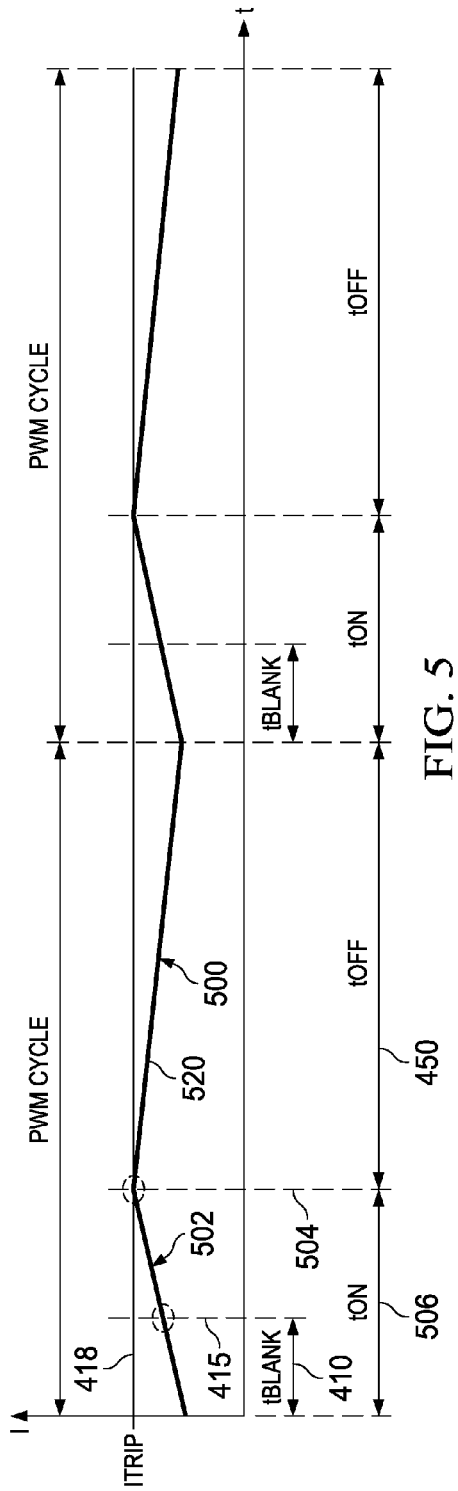
FIG. 4
FIG. 5

US 9,246,424 B2

DYNAMIC MIXED-MODE CURRENT DECAY APPARATUS AND METHODS

PRIORITY CLAIM

This application claims the benefit of priority under 35 U.S.C. §119(e) to U.S. Provisional Patent Application Ser. No. 61/844,759 titled "A Novel Dynamic Mixed Decay Approach Using Continuous Bi-directional Current Sensing for Current Regulation In Stepper Motors," filed on Jul. 10, 2013 and incorporated herein by reference in its entirety.

TECHNICAL FIELD

Structures and methods described herein relate to electromagnetic current regulation in rotating machinery, including control of current decay in a stepper motor winding.

BACKGROUND INFORMATION

In stepper motors, motor position is controlled by regulating electrical current in each motor winding. Different stepper motor designs may have different numbers of windings, with the current waveform in each winding leading or lagging current waveforms associated with the other windings. For purposes of this disclosure, current regulation in a single winding is referred to as an example of the current regulation in each winding.

The current waveform in a given motor winding is, in many modern implementations, shaped by an output of a digital-to-analog converter (DAC). As is well-known in the art, a DAC output waveform, when viewed with sufficient magnification, is formed in a stair-stepped shape. For each digital input code ("DAC code"), an ideal DAC maintains a corresponding analog output voltage level. For example, a series of adjacent input codes (e.g., 00000000, 00000001, 00000010, and 00000011 in the case of binary input codes) applied sequentially at a DAC input results in a stair-stepped output waveform shape with each step up of equivalent magnitude to the previous step up.

In the case of a stepper motor, each DAC input code results in a different mechanical rotational position of the stepper motor rotor. As such, any particular section of the waveform is stair-stepped upward for increasing currents and stair-stepped downward for decreasing currents. Micro-stepping resolution, the number of steps in an electrical 360 degree revolution, is limited by the accuracy with which each motor winding current level can be regulated during the constant current portion of each step. That is, once a DAC input code is applied and the winding current reaches a level corresponding to the top of the DAC step up or to the bottom of the DAC step down, that level of winding current is regulated to avoid any further mechanical rotation or vibration of the rotor until a different DAC input code is applied. Absent such regulation, factors such as supply voltage variations and changes in mechanical loads on the stepper motor may cause winding current to vary during the duration of the desired step.

Like many methods of electrical voltage and current regulation, stepper motor winding current regulation may be hysteresis-based. That is, the regulation method may allow the winding current to ramp up to a set-point level corresponding to an applied DAC code. The set-point level of winding current is referred to herein as "ITRIP." When a forward voltage is applied across the winding, winding current ramps up during a period referred to herein as the "t_ON" period. When the winding current reaches ITRIP, the regulation mechanism then either disallows active drive to the winding or reverses voltage polarity across the winding during a period referred to herein as the "t_OFF" period. During a first portion or all of the t_OFF period referred to herein as the "decay" period, the winding current ramps down toward zero. If the negatively-sloped winding current reaches zero, the regulation mechanism may maintain the winding current at zero for the duration of the t_OFF period until allowing another ramp up to ITRIP. The sum of the t_ON period and the t_OFF period is referred to herein as a PWM cycle.

It is noted that multiple PWM cycles may occur over the duration of any step associated with a given DAC input code. For example, a stepper motor controlling vertical paper positioning in an inkjet printer may move to a particular position and remain at that position for hundreds of milliseconds while the inkjet head moves across the sheet of paper horizontally or even for several seconds to allow ink to dry on the sheet of paper before ejecting the sheet. Several or many PWM current regulation cycles may occur during these periods while the same DAC input code is applied to or latched into the vertical positioning stepper motor to create a corresponding DAC analog output level.

The slope of the decay waveform associated with the t_OFF period is important in the overall scheme of regulating the stepper motor current for the duration of a given step. The inability of conventional decay modes to precisely regulate average current level and ripple in the windings at a particular step may significantly limit micro-stepping resolution for a given stepper motor configuration.

FIG. 1 is a prior-art schematic diagram of a typical "H-bridge" switching apparatus 100 used to regulate stepper motor current. Four switches S1-S4 are sequenced by current regulation logic (not shown) to control current through the winding 110. The current paths 115, 120, and 125 and corresponding directions are indicated by the dashed lines. Feedback to the current regulation logic is provided by a voltage drop across a sense resistor 130 corresponding to current flowing along the paths 115 and 120.

FIG. 2 is a series of prior-art waveform diagrams illustrating various modes of operation of the H-bridge 100 associated with known methods of stepper motor current regulation. Considering now FIG. 2 in light of FIG. 1, the regulation logic turns switches S1 and S2 to a conductive state to ramp up current along the path 115 and through the winding 110 during the t_ON period 215 as shown in the three graphs of FIG. 2. Feedback from the sense resistor 130 may be ignored by the regulation logic during a blanking period tBLANK in order to avoid erratic feedback caused by abrupt current changes in the winding 110 at the start of t_ON.

The three graphs of FIG. 2 illustrate three different decay modes implemented by various prior-art current regulation logic circuits in conjunction with the H-bridge 100. Each decay mode controls the rate of decay of the current waveform through the stepper motor winding. The motor winding current decay rate is controlled in an effort to control jitter in the overall current waveform, particularly at waveform peaks where the slope of the current waveform changes direction and at zero cross-over points where the waveform changes polarity.

The decay portion 220 of the slow decay waveform 222 corresponds to the current path 125 of FIG. 1, implemented by enabling switches S2 and S3 to a conductive state and disabling switches S1 and S4 of the H-bridge 100. Disabling switches S1 and S4 prevents motor drive voltage VM from being applied across the motor winding 110. Enabling switches S2 and S3 allows the slow decay current waveform 220 to slowly dissipate through internal resistance associated with the current path 125. A potential problem exists with slow decay mode, particularly for smaller regulated currents. Energy stored in the inductance of the motor winding 110 may not dissipate completely and take the slow decay current waveform 220 to a sufficiently low level by the end of the t_OFF period and prior to the start of the next PWM cycle. This problem may impose a lower limit on the magnitude of current that may be finely regulated and thus on the driver DAC step size and resolution.

The decay portion 230 of the fast decay waveform 232 corresponds to the current path 120 of FIG. 1, implemented by enabling switches S3 and S4 to a conductive state and disabling switches S1 and S2 of the H-bridge 100. The latter configuration of switches reverses the polarity of voltage applied across the motor winding 110, causing the decay portion 230 of the fast decay current waveform 232 to rapidly decrease to zero. A potential problem with fast decay mode is that the discharge rate of the motor winding 110 during the decay period associated with the decay waveform 230 is approximately equal to the charge rate associated with the t_ON period 215. This may result in choppy regulation reflected as excessive ripple in the overall current waveform, particularly at waveform peaks where the DAC step period is large relative to the DAC step magnitude. The latter problem may impose a limitation on the DAC step size and resolution as the step size becomes low relative to the magnitude of the ripple.

A fixed mixed-mode of decay 240 is known. Fixed mixed-mode is implemented by initially configuring the switches S1-S4 of the H-bridge 100 as described above for fast decay mode 232 to create a period of fast decay t_FAST 250 corresponding to decay waveform portion 255. The H-bridge 100 is then switched to the configuration described above for slow decay mode 222 to create a period of slow decay t_SLOW 260 corresponding to the decay waveform portion 265. One problem with fixed mixed decay mode is that the periods 250 and 260 associated with the fast and slow decay periods, respectively, typically result from a compromise for a given motor and supply voltage. Also, a particular ratio of fixed periods 250 and 260 may be better suited to some current levels and waveform slopes than to others.

BRIEF DESCRIPTION OF THE DRAWINGS

FIG. 4 is a waveform diagram illustrating an example current waveform representing current regulated in a stepper motor winding according to various example activities.

FIG. 5 is a waveform diagram illustrating an example current waveform representing current regulated in a stepper motor winding according to various example activities.

SUMMARY OF THE INVENTION

Figure 2:
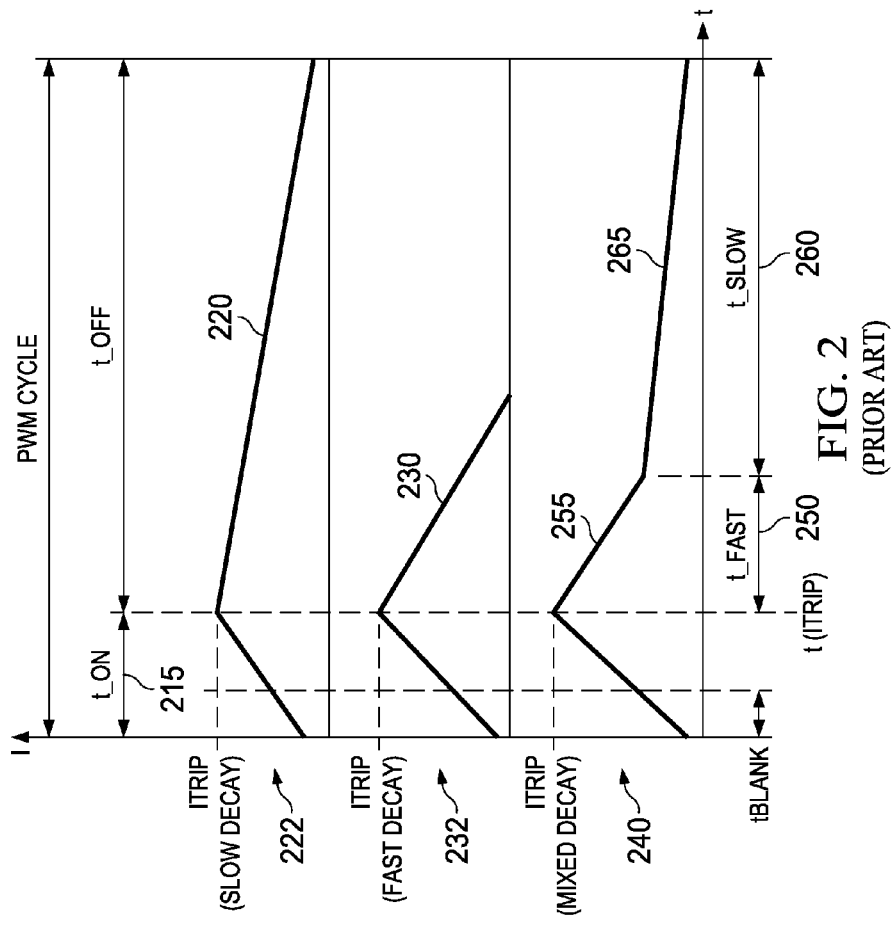
FIG. 2 is a series of prior-art waveform diagrams illustrating various modes of H-bridge operation associated with known methods of stepper motor current regulation.
Figure 1:
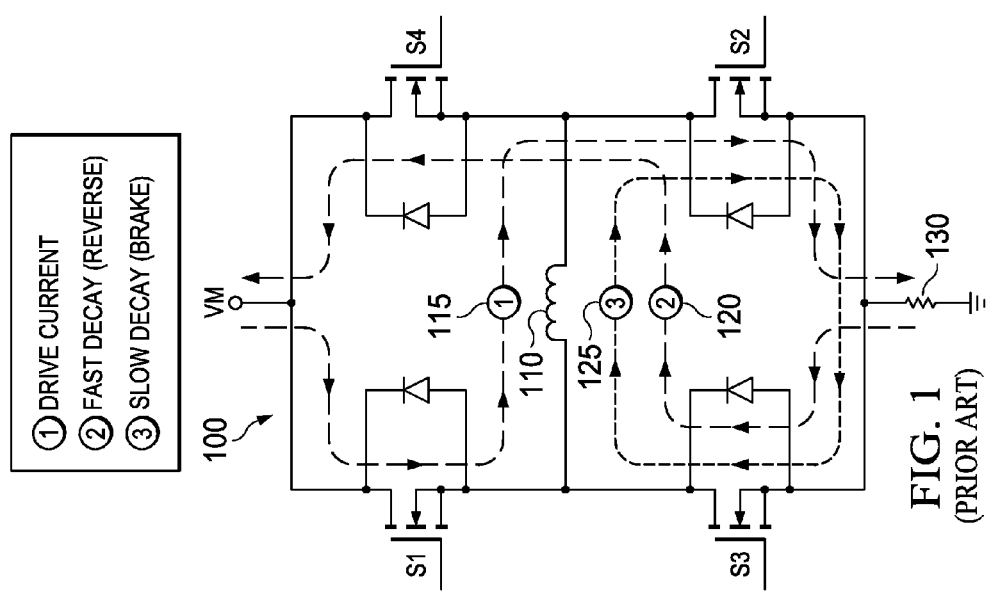
FIG. 1 is a prior-art schematic diagram illustrating a typical H-bridge switching apparatus used to regulate stepper motor current.

Apparatus and methods disclosed herein regulate current in a stepper motor winding to a selected level during a selected period of time. The selected level of motor winding current is proportional to a magnitude of an analog output of a DAC used to generate one or more current waveforms to drive one or more windings of the stepper motor. It is noted that regulation apparatus and methods described herein for a single example winding may apply to each of multiple windings in a stepper motor. The current waveforms are generally sinusoidal as for other types of electrical motors but may be of any shape.

The magnitude of the DAC analog output corresponds to DAC code presented at digital inputs to the DAC and/or latched into an input section of the DAC. The selected level of current in the motor winding corresponding to a particular DAC code is referred to herein as the current regulation setpoint "ITRIP." The selected period of time corresponds to a period during which the magnitude of the DAC analog output is ideally constant for a particular DAC code and is referred to herein as the "step period." Regulation of the winding current to ITRIP may alleviate variations in the winding current caused by supply voltage variations, variations in mechanical loads on the stepper motor, etc.

The regulation mechanism described herein regulates stepper motor driver current during a step period and following points of transition in levels of ITRIP corresponding to transitions from one DAC code to another. A dynamic mixed-mode of current decay is implemented during a PWM cycle and and/or for multiple PWM cycles generated by embodiments herein during a step period. It is noted that PWM cycles implemented by these embodiments are asynchronous to step periods. Thus, a PWM cycle may be in process when the DAC output transitions to a succeeding step in response to a subsequent DAC code.

Apparatus and methods herein implement continuous bi-directional current sensing to determine both the magnitude of winding current and the slope of a waveform representing winding current as regulated during a PWM cycle associated with a particular DAC code. Current magnitude and direction may be sensed in various ways consistent with this disclosure. Thus, some example apparatus and/or methods herein may sense winding current magnitude by sensing a magnitude of a voltage drop across a sense resistor in series with the winding. Likewise, example embodiments may determine whether the slope of winding current is positive or negative by sensing the polarity of a voltage drop across a sense resistor. However, any apparatus and/or methods known in the art of sensing winding current magnitude and slope are contemplated by this disclosure and are equally applicable to this disclosure. It is also noted that some embodiments may implement current sensing as asynchronous to step periods and/or PWM cycles Embodiments herein more precisely control periods of current rise and fast and slow current decay during a PWM cycle as a function of the sensed magnitude of the winding current, the magnitude of the winding current regulation setpoint ITRIP, whether the sensed winding current is greater than or less than ITRIP at a selected sampling time, whether the sensed winding current is increasing or decreasing when a waveform of the sensed winding current crosses over ITRIP, and whether or not the magnitude of ITRIP changes during a PWM cycle in response to receipt of a subsequent DAC code.

More accurate current regulation may permit a greater number of finer levels of micro-stepping and consequent higher resolution. Finer micro-stepping resolution may in turn enable more precise and smoother operation of robotics including medical surgical robotic mechanisms, medical pumps, security cameras, stage lightening, cash machines etc.

DETAILED DESCRIPTION

Figure 3A:
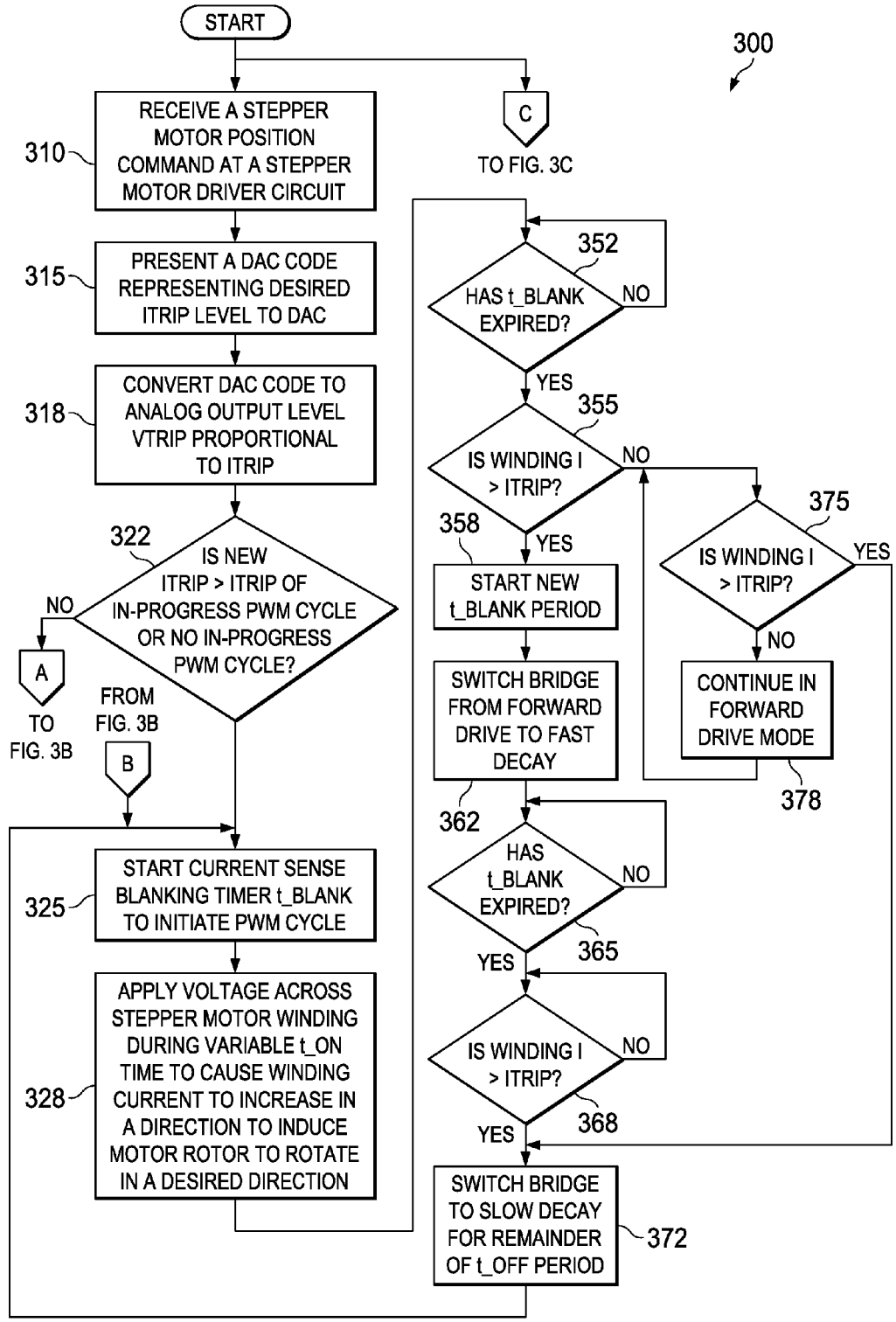
FIGS. 3A-3C are a flow diagram illustrating a method of stepper motor winding current regulation according to various example activities associated with the invention.
Figure 3B:
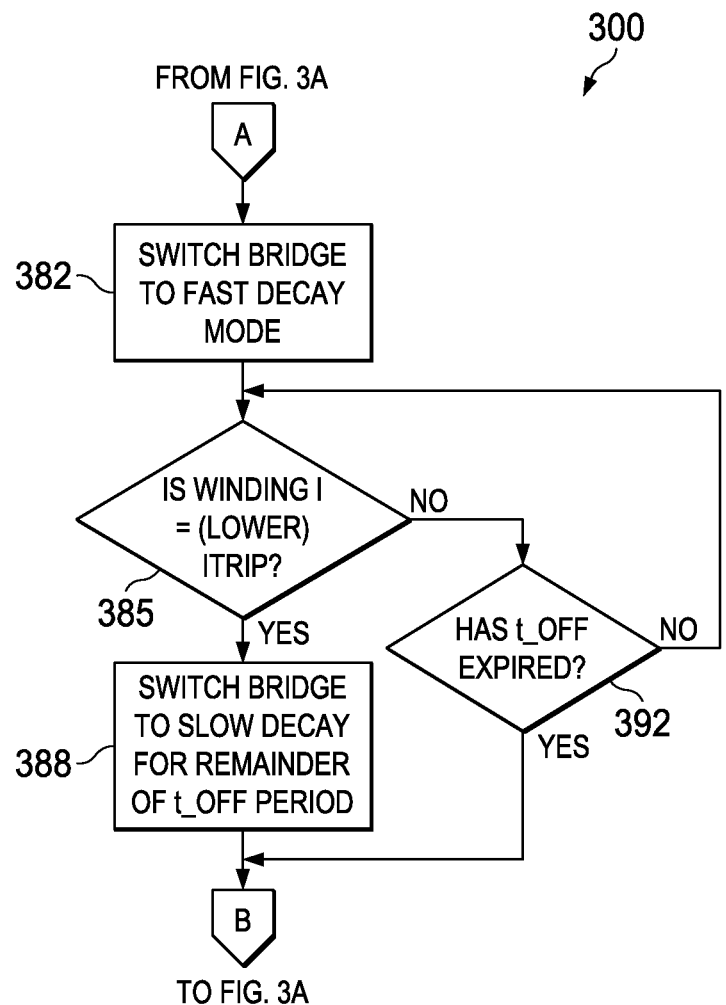
Figure 3C:
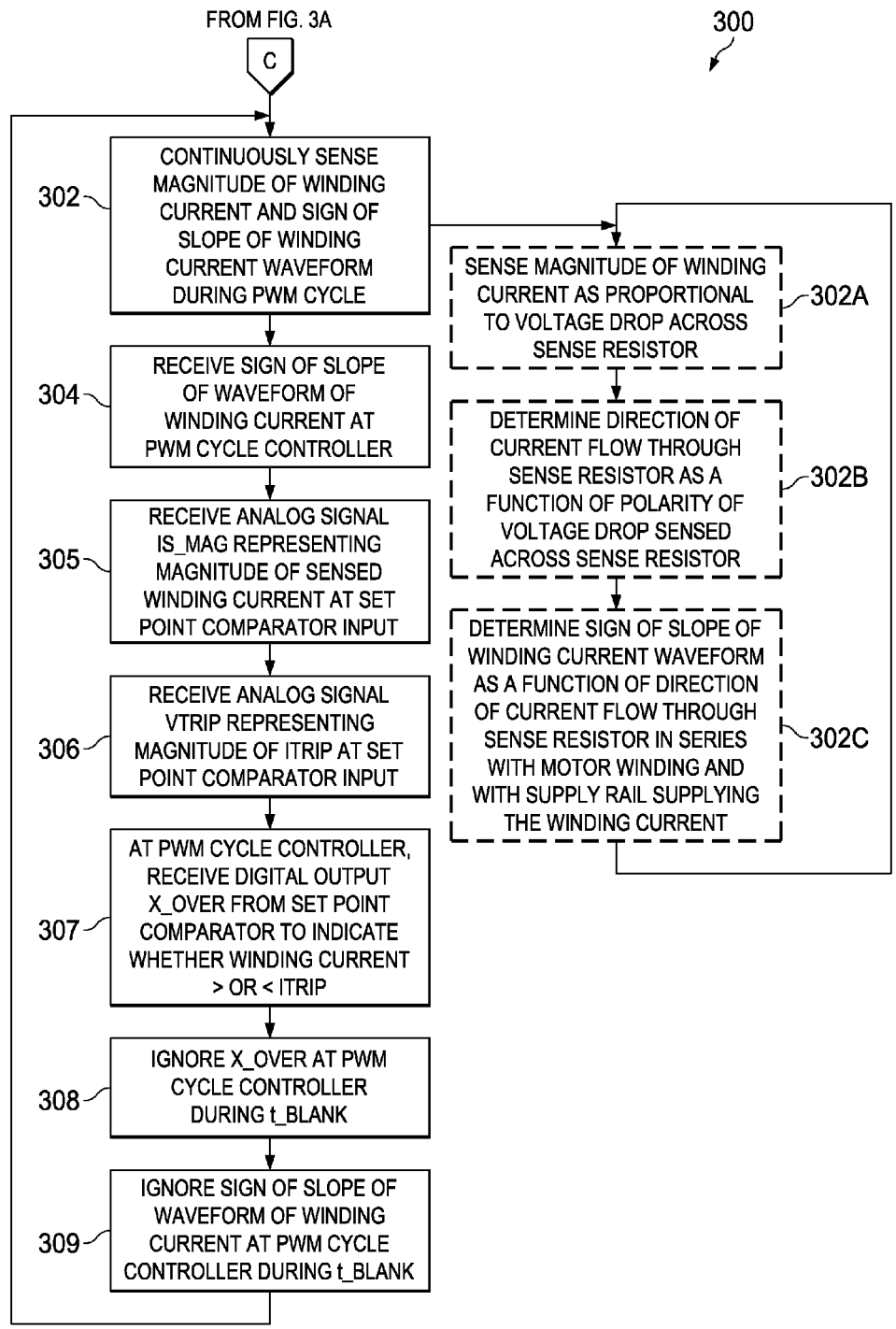

FIGS. 3A-3C are a flow diagram illustrating a method 300 of stepper motor winding current regulation according to various example activities associated with the invention. Some or all of the activities of the method 300 may be carried out by embodiments of an apparatus described further below or other apparatus. The method 300 may include generating a sequence of DAC codes at an indexer. The sequence of DAC codes corresponds to a desired shape of a stepper motor winding current waveform to be used to move a rotor of the stepper motor from a current position to a new position. The method 300 may also include sequentially presenting the sequence of DAC codes to one or more DAC inputs. The portion of the method 300 described below focuses on activities associated with generating PWM cycles to regulate winding current corresponding to a particular DAC code. The method 300 as described below also includes responding to changes in regulation set-point resulting from a transition from one DAC code to a subsequently-received DAC code.

The method 300 commences at block 302 with sensing a magnitude of the winding current and a sign of a slope of a waveform of the winding current. Winding current magnitude and slope direction are continually sensed during the PWM cycle. The magnitude of the winding current may, but need not be, sensed as a voltage drop across a sense resistor in series with the motor winding and with a voltage supply rail supplying the winding current, at block 302A. The method 300 may include determining a direction of current flow through the sense resistor, if so implemented, as a function of a polarity of the voltage drop across the sense resistor, at block 302B. The method 300 may also optionally include determining the slope of the winding current waveform as a function of the direction of current flow through the sense resistor, at block 302C.

The method 300 continues at block 304 with receiving the sign of the slope of the waveform of the winding current at a PWM cycle controller. The method 300 includes receiving an analog signal "IS_MAG" representing a magnitude of the sensed winding current at a first input of a set-point comparator, at block 305. The method 300 also includes receiving the analog signal VTRIP, representing the magnitude of ITRIP, at a second input of the set-point comparator, at block 306. The method 300 further includes receiving a digital output "X_OVER" from the set-point comparator at a PWM cycle controller, at block 307. X_OVER indicates to the PWM cycle controller whether the winding current is greater than or less than ITRIP.

The method 300 also includes ignoring X_OVER at the PWM cycle controller during tBLANK, at block 308. The method 300 also includes ignoring the sign of the slope of the waveform of the winding current at the PWM cycle controller during tBLANK, at block 309. The winding current monitoring activities of blocks 302-309 repeat continuously in parallel with other activities associated with the method 300 during each PWM cycle. However, the winding current monitoring indicators are ignored by the PWM controller during tBLANK periods as indicated.

The method 300 continues at block 310 with receiving a stepper motor position command at a stepper motor driver circuit. The method 300 continues at block 315 with presenting a selected DAC code to a DAC. The DAC code represents a desired winding current regulation set-point ITRIP. The method 300 also includes converting the DAC code to an analog output level VTRIP, at block 318. VTRIP is thus proportional to ITRIP.

The method 300 also includes determining whether a PWM cycle is in progress when a new DAC code is received and whether the new ITRIP set-point associated with the new DAC code is greater than the previous ITRIP set-point, at block 322. If no PWM cycle is in progress upon receipt of the new DAC code or if a PWM cycle is in progress but the new ITRIP set-point is greater than ITRIP established for the PWM cycle in progress, the method 300 includes initiating a PWM cycle by starting a current sense blanking time "t-BLANK," at block 325. The method proceeds along a flow path in this case to include applying a voltage across a winding in which current is to be regulated, at block 328. The voltage is applied during a variable period "t_ON" with a polarity to cause winding current to increase during t_ON in a direction to induce a rotor of the motor to rotate in a desired direction.

FIG. 4 is a waveform diagram illustrating an example current waveform 400 representing current regulated in a stepper motor winding according to various example activities. The waveform 400 is an example result of current regulation activities represented by the blocks 322-372 of the method 300. Continuing now with a review of the method 300 of FIGS. 3A-3B while observing the example resulting waveform 400 of FIG. 4, the method 300 includes determining whether the period tBLANK 410 has expired, at block 352. At the expiration 415 of tBLANK 410, the method 300 includes determining whether the sensed winding current 417 is greater than ITRIP 418, at block 355.

If the sensed current 417 is greater than ITRIP 418, the method 300 includes initiating an additional blanking period tBLANK 420, at block 358. The method 300 also includes switching an H-bridge associated with the winding to reverse the polarity of the voltage across the stepper motor winding, at block 362. Doing so causes the winding current to rapidly decay in fast decay mode 425. The method 300 further includes determining whether the additional blanking period tBLANK 420 has expired, at block 365. If so, the method 300 includes determining whether the winding current has fallen below ITRIP 418 at the time of expiration 430 of tBLANK 420, at block 368. If so, the method 300 further includes removing the voltage across the winding of the stepper motor while maintaining a closed circuit between terminals of the winding, at block 372. Doing so allows current in the winding to slowly decay through the closed circuit in slow decay mode 440. Periods of fast decay and slow decay sum to a fixed period of t_OFF time 450. The method 300 continues at block 325 with initiating another PWM cycle.

FIG. 5 is a waveform diagram illustrating an example current waveform 500 representing current regulated in a stepper motor winding according to various example activities. The waveform 500 is an example result of current regulation activities represented by the blocks 322-355 and the blocks 375, 378, and 372 of the method 300. Continuing now with a review of the method 300 of FIGS. 3A-3B while observing the resulting waveform 500 of FIG. 5, the method 300 includes the case of the magnitude of the winding current 502 being less than ITRIP 418 at the end 415 of the period tBLANK 410. In that case, the method 300 includes determining the point in time 504 of the end of t_ON 506. The time 504 is when the winding current 502 is sensed as having ramped up to ITRIP 418 following the end 415 of the tBLANK period 410. Some versions of the method 300 may determine the time 504 via a loop including blocks 375 and 378. The method 300 may continue in forward drive mode at block 378 until the method 300 determines that the winding current 502 is equal to ITRIP 418 at the time 504. At the time 504, the method 300 switches to slow decay mode for a fixed t_OFF period 450, resulting in the slow decay waveform 520. The method 300 continues at block 325 with initiating another PWM cycle.

Step position commands are received asynchronously from PWM regulation cycles generated by apparatus and methods herein for each DAC code, as previously mentioned. Thus, a new DAC code may be received while a PWM cycle associated with a current DAC code is in progress. The method 300 responds to these cases to continue to finely regulate winding current even if the regulation set-point ITRIP abruptly changes in response to the receipt of a new DAC code.

The method 300 thus includes receiving a new stepper motor position command at a stepper motor controller, at block 310. The method 300 also includes presenting a DAC code associated with the new stepper motor position to the DAC to generate a new ITRIP regulation set-point, at block 315. The method 300 further includes determining whether a PWM cycle associated with the prior ITRIP level is in progress, at block 322. If so, the method 300 also determines whether the new ITRIP level is greater than the ITRIP level of the PWM cycle in process, also at block 322. If a PWM cycle is in progress and the new ITRIP level is greater than the ITRIP level of the PWM cycle in progress, the method 300 includes terminating the PWM cycle in progress and initiating a new PWM cycle beginning at block 325. The method 300 in this case follows the path of blocks 322-355 and blocks 375, 378, and 372 as described above using FIGS. 3A, 3B, and 5. To avoid redundancy, the detailed description of these blocks related above will not be repeated here.

Figure 6:
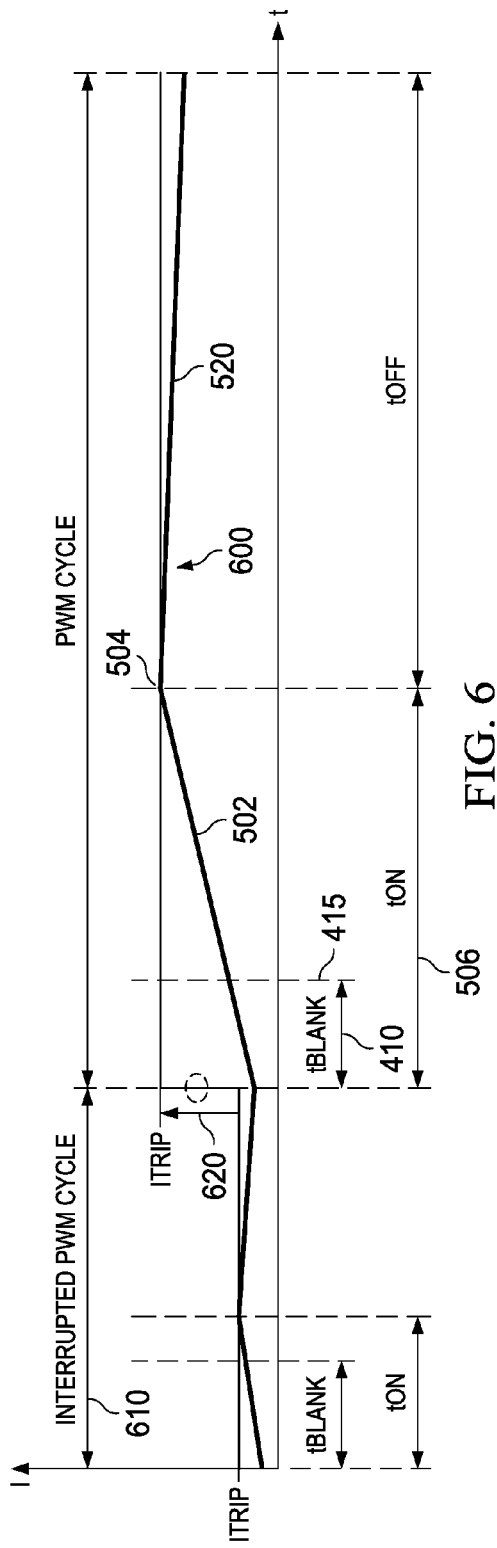
FIG. 6 is a waveform diagram illustrating an example current waveform representing current regulated in a stepper motor winding according to various example activities.

FIG. 6 is a waveform diagram illustrating an example current waveform 600 representing current regulated in a stepper motor winding according to various example activities. The waveform 600 is an example result of current regulation activities in the case described immediately above. That is, a PWM cycle 610 in progress is interrupted by receipt of a new DAC code resulting in an increase 620 in ITRIP level. Following the increase 620 in ITRIP, the method 300 is seen to result in similar winding current waveform behavior as shown in FIG. 5. Specifically, the magnitude of the winding current waveform 502 is less than ITRIP at the end 415 of the period tBLANK 410. When the waveform reaches ITRIP at the end 504 of t_ON 506, the method 300 enters slow decay mode resulting the slow decay waveform 520.

In the case of a decrease in ITRIP level while a PWM cycle is in progress as determined at block 322, the method 300 includes immediately switching to fast decay mode without current sense blanking, at block 382. The method 300 also includes determining whether the sensed winding current has decreased to the new, lower level of ITRIP during the fixed t_OFF period, at blocks 385 and 392. If so, upon reaching ITRIP, the method 300 switches to slow decay mode for the remainder of the fixed t_OFF period, at block 388. If t_OFF expires before the sensed winding current decreases to the new, lower level of ITRIP in fast decay, the method 300 continues at block 325 with initiating a new PWM cycle. It is noted that the latter case will result in a new ramp-up of the winding current during the initial current sensing blanking time tBLANK associated with the new PWM cycle at blocks 325-352. This will occur even though the winding current is already above ITRIP. However, the method 300 will follow blocks 355-372 to maintain fast decay until the winding current eventually falls below the new, lower ITRIP set-point.

Figure 7:
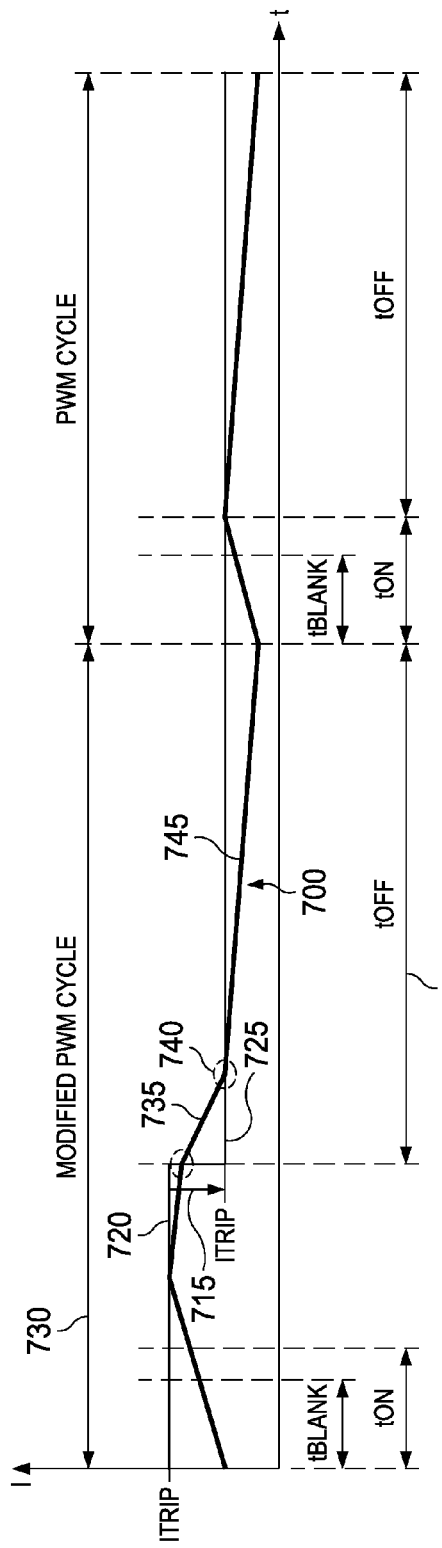
FIG. 7 is a waveform diagram illustrating an example current waveform representing current regulated in a stepper motor winding according to various example activities.

FIG. 7 is a waveform diagram illustrating an example current waveform 700 representing current regulated in a stepper motor winding according to various example activities. The waveform 700 is an example result of current regulation activities in the case described immediately above. ITRIP decreases in an amount 715 from a higher level 720 to a lower level 725 during a PWM cycle 730. The method 300 modifies the PWM cycle 730 by immediately initiating fast decay mode 735 in response to the decrease 715 in ITRIP level. Upon reaching the new, lower-level ITRIP 725 at point 740, the method 300 initiates slow decay mode 745 for the remainder of the fixed t_OFF time 450. Depending upon the magnitude of the decrease 715 in ITRIP and other factors, t_OFF may expire before the winding current waveform 700 reaches the new, lower-level ITRIP 725, even in fast decay. The latter condition is not shown on FIG. 7 but results in the generation of one or more successive PWM cycles as described above.

Figure 8:
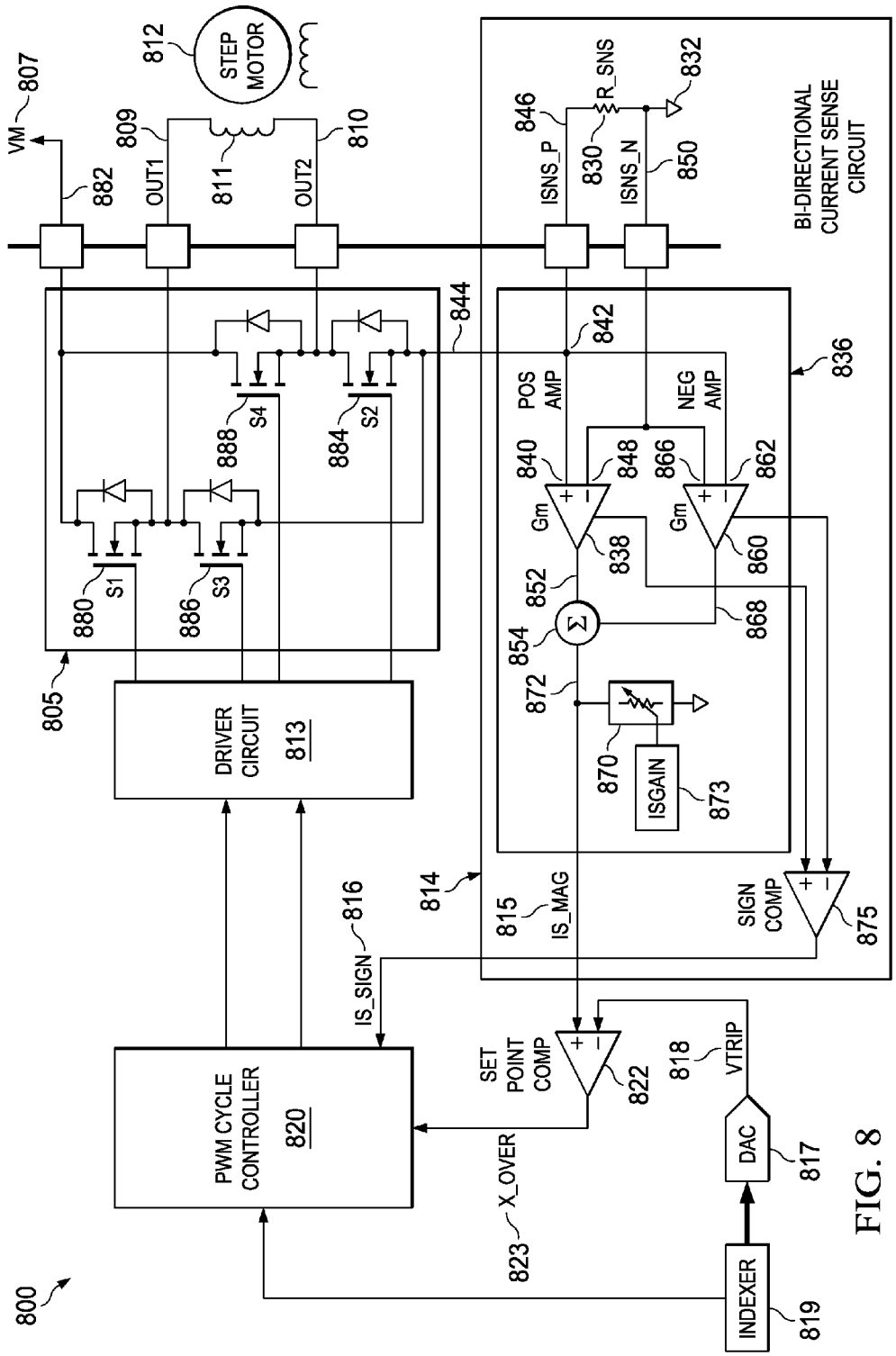
FIG. 8 is a schematic diagram illustrating a stepper motor current regulation apparatus according to various example embodiments of the invention.

FIG. 8 is a schematic diagram illustrating a stepper motor current regulation apparatus 800 according to various example embodiments. The apparatus 800 is a closed-loop control apparatus and will be described generally in terms of current driving circuitry, current sensing circuitry, and current regulation circuitry. Individual components of the driving, sensing, and regulation circuitry will then be enumerated in detail.

The stepper motor winding current regulation apparatus 800 includes an H-bridge 805. The H-bridge 805 controls a voltage source 807 at terminals 809 ("high side terminal") and 810 ("low side terminal") of a winding 811 of a stepper motor 812. The regulation apparatus 800 also includes a driver circuit 813 coupled to the H-bridge 805. The driver circuit 813 includes driver transistors to control switches associated with the H-bridge 805. The driver circuit 813 places switches of the H-bridge 805 in various configurations of conduction to control current flow through the winding 811 of the stepper motor 812 as further described below.

The apparatus 800 also includes a bi-directional current sensing circuit 814 coupled to the H-bridge 805. The current sensing circuit 814 senses a magnitude of current flowing in the winding 811 of the stepper motor 812. The current sensing circuit 814 also generates a control signal output level "IS_MAG" 815. IS_MAG 815 is proportional to the magnitude of the winding current as sensed by the current sensing circuit 814. The current sensing circuit also generates a digital polarity signal "IS_SIGN" 816. IS_SIGN 816 indicates whether the winding current is rising or falling.

The apparatus 800 further includes a DAC 817 communicatively coupled to the bi-directional current sensing circuit 814. The DAC 817 converts a DAC code representing a magnitude of a winding current set-point ITRIP to an analog level VTRIP 818. Some embodiments of the stepper motor winding current regulation apparatus 800 also include an indexer 819 coupled to the DAC 817. The indexer 819 generates a sequence of DAC codes corresponding to a desired shape of a stepper motor winding current waveform associated with one or more stepper motor position commands.

The apparatus 800 also includes a PWM cycle controller 820 coupled to the bi-directional current sensing circuit 814. The PWM cycle controller 820 regulates the winding current as a function one or more of the sensed winding current represented by IS_MAG 815, whether the winding current is rising or falling as represented by IS_SIGN 816, the winding current regulation set-point ITRIP as represented by VTRIP 818, whether the sensed winding current is greater than or less than ITRIP at a selected sampling time during a PWM cycle, the state of IS_SIGN 816 when a waveform of the sensed winding current crosses over ITRIP, and/or whether or not ITRIP changes during a PWM cycle in response to a receipt of a subsequent DAC code.

The stepper motor winding current regulation apparatus 800 further includes a set-point comparator 822 coupled to the DAC 817. The set-point comparator 822 compares a magnitude of VTRIP 818 to a magnitude of IS_MAG 815 and generates a digital output "X_OVER" 823. X_OVER 823 indicates whether the magnitude of IS_MAG 815 is greater than or less than the magnitude of VTRIP 818. A change in state of X_OVER 823 thus represents a time when the winding current waveform represented by IS_MAG 815 crosses over the winding current set-point level represented by VTRIP 818. The IS_SIGN 816 output of the current sensing circuit 814 indicates the sign of the slope of the sensed current waveform, as previously described. Together, X_OVER 823 and IS_SIGN 816 indicate the behavior of the sensed current waveform relative to the winding current set-point ITRIP.

The bi-directional current sensing circuit 814 will now be described in further detail. The sensing circuit 814 includes a sense resistor 830. The sense resistor 830 is coupled in series with the winding 811 of the stepper motor 812 and is coupled to a ground rail 832 such that the winding current flows through the sense resistor 830. The current sensing circuit 814 also includes a sense amplifier 836 coupled to the sense resistor 830. The sense amplifier 836 senses a magnitude and a direction of the winding current flowing through the sense resistor 830. In some embodiments, the sense amplifier 836 senses the magnitude and direction of winding current as a magnitude and polarity of a voltage drop across the sense resistor 830.

In some embodiments, the sense amplifier 836 includes a first transconductance amplifier 838. A non-inverting input 840 of the first transconductance amplifier 838 is coupled to a junction 842 of a low-side output 844 of the H-bridge 805 and a non-grounded terminal 846 of the sense resistor 830. An inverting input 848 of the first transconductance amplifier 838 is coupled to a grounded terminal 850 of the sense resistor 830. An output 852 of the first transconductance amplifier 838 is coupled to a current summing junction 854.

In some embodiments, the sense amplifier 836 also includes a second transconductance amplifier 860. An inverting input 862 of the second transconductance amplifier 860 is coupled to the junction 842 of the low-side output 844 of the H-bridge 805 and the non-grounded terminal 846 of the sense resistor 830. A non-inverting input 866 of the second transconductance amplifier 860 is coupled to the grounded terminal 850 of the sense resistor 830. An output 868 of the second transconductance amplifier 860 is coupled to the current summing junction 854. A variable sense amplifier gain control resistor 870 is coupled between an output 872 of the summing junction 854 and ground 832. Some embodiments of the sense amplifier 836 also include a gain control circuit 873 coupled to the gain control resistor 870. The gain control circuit 873 controls the gain of the sense amplifier 836 by adjusting a resistance value of the variable sense amplifier gain control resistor 870.

The bi-directional current sense circuit 814 also includes a sign comparator 875 coupled to the sense amplifier 836. The sign comparator 875 determines whether a first portion (e.g., the first transconductance amplifier 838 of the example embodiment) of the sense amplifier 836 is active, indicating a direction of current flow through the sense resistor 830 to ground 832. The sign comparator 875 also determines whether a second portion (e.g., the second transconductance amplifier 860 of the example embodiment) of the sense amplifier 836 is active, indicating a direction of current flow through the sense resistor 830 from ground 832. The sign comparator 875 generates the digital polarity signal "IS_SIGN" 816.

Turning back now to a more detailed explanation of the H-bridge 805, the H-bridge 805 includes a first switch 880 coupled between a positive voltage supply rail 882 and the high side terminal 809 of the winding 811 of the stepper motor 812. The H-bridge 805 also includes a second switch 884 coupled between the low side terminal 810 of the winding 811 and a first terminal 846 of the sense resistor 830. The first and second switches 880 and 884, respectively, are switched on to apply the voltage 807 across the winding 811. The voltage 807 is applied across the winding 811 with a polarity to cause current through the winding 811 to ramp up and induce a rotor component of the stepper motor 812 to rotate in a desired direction.

The H-bridge 805 also includes a third switch 886 coupled between the high side terminal 809 of the winding 811 and the first terminal 846 of the sense resistor 830. The second and third switches 884 and 886, respectively, are switched on to form a short circuit across the winding 811 to cause current through the winding 811 to slowly decay. The H-bridge 805 further includes a fourth switch 888 coupled between the positive voltage supply rail 882 and the low side terminal 810 of the winding 811. The third and fourth switches 886 and 888, respectively, are switched on and the first and second switches 880 and 884, respectively, are switched off to reverse the polarity of the voltage 807 applied across the winding 811. Doing so causes current through the winding 811 to rapidly decay.

Methods and apparatus described herein may be useful in applications other than regulating a step current in a stepper motor winding. The method 300 and the apparatus 800 are intended to provide a general understanding of the sequences of various methods and the structures of various embodiments. They are not intended to serve as complete descriptions of all elements and features of methods, apparatus and systems that might make use of these example sequences and structures.

The various embodiments may be incorporated into semiconductor analog and digital circuits for use in receptacle power converters, electronic circuitry used in computers, communication and signal processing circuitry, single-processor or multi-processor modules, single or multiple embedded processors, multi-core processors, data switches, and application-specific modules including multi-layer, multi-chip modules, among others. Such apparatus and systems may further be included as sub-components within a variety of electronic systems such as robotics, medical devices (e.g., heart monitor, blood pressure monitor, etc.), motor vehicles, televisions, cellular telephones, personal computers (e.g., laptop computers, desktop computers, handheld computers, tablet computers, etc.), workstations, radios, video players, audio players (e.g., MP3 (Motion Picture Experts Group, Audio Layer 3) players), set top boxes, and others.

Methods and structures disclosed herein more precisely control periods of current rise and fast and slow current decay in a stepper motor winding during a PWM cycle as a function of the sensed magnitude of the winding current, the magnitude of the winding current regulation set-point ITRIP, whether the sensed winding current is greater than or less than ITRIP at a selected sampling time, whether the sensed winding current is increasing or decreasing when a waveform of the sensed winding current crosses over ITRIP, and whether or not the magnitude of ITRIP changes during a PWM cycle in response to receipt of a subsequent DAC code. More accurate current regulation may permit a greater number of finer levels of micro-stepping and consequent higher resolution. Finer micro-stepping resolution may in turn enable more precise and smoother operation of robotics including medical surgical robotic mechanisms, medical pumps, security cameras, stage lightening, cash machines etc. and enable applications heretofore unreachable with the use of stepper motors.

By way of illustration and not of limitation, the accompanying figures show specific aspects in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The aspects illustrated are described in sufficient detail to enable those skilled in the art to practice the teachings disclosed herein. Other aspects may be used and derived therefrom, such that structural and logical substitutions and changes may be made without departing from the scope of this disclosure. This Detailed Description, therefore, is not to be taken in a limiting sense. The breadth of various aspects is defined by the appended claims and the full range of equivalents to which such claims are entitled.

Such aspects of the inventive subject matter may be referred to herein individually or collectively by the term "invention" merely for convenience and without intending to voluntarily limit this application to any single invention or inventive concept, if more than one is in fact disclosed. Thus, although specific aspects have been illustrated and described herein, any arrangement calculated to achieve the same purpose may be substituted for the specific aspects shown. This disclosure is intended to cover any and all adaptations or variations of various aspects.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A method of stepper motor winding current regulation, comprising:
   reversing a polarity of a voltage across a winding of a stepper motor to cause current flowing in the winding ("winding current") to rapidly decay ("fast decay mode") if a magnitude of the winding current is sensed as being greater than a magnitude of a desired winding current regulation set-point ("ITRIP") at an end of a first current-sensing blanking period ("tBLANK") occurring at a beginning of a pulse-width modulation ("PWM") current regulation cycle;
   waiting an additional tBLANK period beginning at an initiation of the fast decay mode before sampling the winding current;
   at a time following an expiration of the additional tBLANK period when the winding current is sensed as having fallen below ITRIP, removing the voltage across the winding of the stepper motor while maintaining a closed circuit between terminals of the winding to allow current in the winding to slowly decay through the closed circuit ("slow decay mode"), periods of fast decay and slow decay summing to a fixed period of time ("t_OFF"); and
   switching to slow decay mode when the winding current is sensed as having ramped up to ITRIP at a time following the end of the first tBLANK period if the winding current is sensed as being less than ITRIP at the end of the first tBLANK period, and continuing to operate in slow decay mode for the fixed period of time t_OFF.

2. The method of stepper motor winding current regulation of claim 1, further comprising:
   receiving a stepper motor position command at a stepper motor driver circuit.

3. The method of stepper motor winding current regulation of claim 1, further comprising:
   at a digital-to-analog converter ("DAC"), presenting a selected digital input ("DAC code") representing the desired winding current regulation set-point ITRIP; and
   converting the DAC code to an analog output level ("VTRIP") such that VTRIP is proportional to ITRIP.

4. The method of stepper motor winding current regulation of claim 1, further comprising:
   applying a voltage across the winding of the stepper motor during a variable t_ON time to cause the winding current to increase during the t_ON time in a direction to induce a rotor associated with the stepper motor to rotate in a desired direction.

5. The method of stepper motor winding current regulation of claim 1, further comprising:
   sensing a magnitude of the winding current and a sign of a slope of a waveform of the winding current;
   receiving the sign of the slope of the waveform of the winding current at a PWM cycle controller; and
   ignoring the sign of the slope of the waveform of the winding current at the PWM cycle controller during tBLANK.

6. The method of stepper motor winding current regulation of claim 5, further comprising:
   determining the sign of the slope of the waveform of the winding current as a function of a direction of current flow through a sense resistor in series with the motor winding and with a supply rail supplying the winding current.

7. The method of stepper motor winding current regulation of claim 6, further comprising:
   determining the magnitude of the winding current by sensing a magnitude of a voltage drop across the sense resistor; and
   determining the direction of current flow through the sense resistor as a function of a polarity of the voltage drop across the sense resistor.

8. The method of stepper motor winding current regulation of claim 1, further comprising:
   receiving an analog signal ("IS_MAG") representing a magnitude of the sensed winding current at a first input of a set-point comparator;
   receiving an analog signal ("VTRIP") of a magnitude representing ITRIP at a second input of the set-point comparator;
   receiving a digital output ("X_OVER") of the set-point comparator at a PWM cycle controller, X_OVER to indicate to the PWM cycle controller whether the winding current is greater than or less than ITRIP; and
   ignoring X_OVER at the PWM cycle controller during tBLANK.

9. A method of stepper motor winding current regulation, comprising:
- receiving a new stepper motor position command at a stepper motor controller during a period of a pulse-width modulation ("PWM") cycle in process, the new stepper motor position command resulting in a change in a magnitude of a winding current set-point ("ITRIP");
- terminating the PWM cycle in process and initiating a new PWM cycle if the magnitude of ITRIP increases;
- if the magnitude of ITRIP decreases, switching to a fast decay mode and maintaining the fast decay mode until the decreased level of ITRIP is reached, then switching to a slow decay mode and maintaining the slow decay mode until expiration of a fixed t_OFF period; and
- initiating a new PWM cycle if ITRIP decreases and if the decreased level of ITRIP is not reached in the fast decay mode before expiration of the fixed t_OFF period.

10. The method of stepper motor winding current regulation of claim 9, further comprising:
- at an indexer, generating a sequence of DAC codes corresponding to a desired shape of a stepper motor winding current waveform to be used to move a rotor of the stepper motor from a current position to a new position according to the stepper motor position command; and
- sequentially presenting the sequence of DAC codes to at least one input of a DAC.

11. The method of stepper motor winding current regulation of claim 10, further comprising:
- at the DAC, for each DAC code of the sequence, converting the DAC code to an analog output level VTRIP, VTRIP to represent the magnitude of ITRIP for the DAC code.

12. The method of stepper motor winding current regulation of claim 11, further comprising:
- applying a voltage across the winding of the stepper motor during a variable t_ON time to cause the winding current to increase during the t_ON time in a direction to induce a rotor associated with the stepper motor to move in a desired rotational direction.

13. A stepper motor winding current regulation apparatus, comprising:
- an H-bridge to control a voltage source at terminals of a winding of a stepper motor;
- a bi-directional current sensing circuit coupled to the H-bridge to sense a magnitude of current flowing in the winding ("winding current") of the stepper motor, to generate a control signal output level ("IS_MAG") proportional to the magnitude of the winding current, and to generate a digital polarity signal ("IS_SIGN") to indicate whether the winding current is rising or falling;
- a digital-to-analog converter ("DAC") communicatively coupled to the bi-directional current sensing circuit to convert a DAC code representing a magnitude of a winding current set-point ("ITRIP") to an analog level ("VTRIP"); and
- a pulse-width modulation ("PWM") cycle controller coupled to the bi-directional current sensing circuit to regulate the winding current as a function of at least one of the sensed winding current represented by IS_MAG, IS_SIGN, ITRIP as represented by VTRIP, whether the sensed winding current is greater than or less than ITRIP at a selected sampling time during a PWM cycle, the state of IS_SIGN when a waveform of the sensed winding current crosses over ITRIP, and whether or not ITRIP changes during a PWM cycle in response to a receipt of a subsequent DAC code.

14. The stepper motor winding current regulation apparatus of claim 13, further comprising:
- a set-point comparator coupled to the DAC to compare a magnitude of VTRIP to a magnitude of IS_MAG and to generate a digital output "X_OVER" to indicate whether the magnitude of IS_MAG is greater than or less than the magnitude of VTRIP.

15. The stepper motor winding current regulation apparatus of claim 13, further comprising:
- a driver circuit coupled to the H-bridge to control switches associated with the H-bridge.

16. The stepper motor winding current regulation apparatus of claim 13, the bi-directional current sensing circuit further comprising:
- a sense resistor coupled in series with the winding of the stepper motor and coupled to a ground rail such that the winding current flows through the sense resistor;
- a sense amplifier coupled to the sense resistor to sense a magnitude and a direction of the winding current flowing through the sense resistor; and
- a sign comparator coupled to the sense amplifier to determine whether a first portion of the sense amplifier is active, indicating a direction of current flow through the sense resistor to ground or whether a second portion of the sense amplifier is active, indicating a direction of current flow through the sense resistor from ground, the sign comparator to generate the digital polarity signal "IS_SIGN".

17. The stepper motor winding current regulation apparatus of claim 16, the sense amplifier further comprising:
- a first transconductance amplifier, a non-inverting input of the first transconductance amplifier coupled to a junction of a low-side output of the H-bridge and a non-grounded terminal of the sense resistor, an inverting input of the first transconductance amplifier coupled to the grounded terminal of the sense resistor, and an output of the first transconductance amplifier coupled to a current summing junction;
- a second transconductance amplifier, an inverting input of the second transconductance amplifier coupled to the junction of the low-side output of the H-bridge and the non-grounded terminal of the sense resistor, a non-inverting input of the second transconductance amplifier coupled to a grounded terminal of the sense resistor, and an output of the second transconductance amplifier coupled to the current summing junction; and
- a variable sense amplifier gain control resistor coupled between an output of the summing junction and ground.

18. The stepper motor winding current regulation apparatus of claim 17, the sense amplifier further comprising:
- a gain control circuit to control a gain of the sense amplifier by adjusting a resistance of the variable sense amplifier gain control resistor.

19. The stepper motor winding current regulation apparatus of claim 13, the H-bridge further comprising:
- a first switch coupled between a positive voltage supply rail and a high side terminal of the winding of the stepper motor;
- a second switch coupled between a low side terminal of the winding and a first terminal of a sense resistor associated with the bi-directional current sensing circuit, a second terminal of the sense resistor coupled to ground, the first and second switches to be switched on to apply a voltage across the winding with a polarity to cause current through the winding to ramp up and induce a rotor component of the stepper motor to rotate in a desired direction;
- a third switch coupled between the high side terminal of the winding and the first terminal of the sense resistor, the second and third switches to be switched on to form a short circuit across the winding terminals to cause current through the winding to slowly decay; and a fourth switch coupled between the positive voltage supply rail and the low side terminal of the winding, the third and fourth switches to be switched on and the first and second switches to be switched off to reverse the polarity of the voltage applied across the winding to cause current through the winding to rapidly decay.

20. The stepper motor winding current regulation apparatus of claim 13, further comprising:

an indexer coupled to the DAC to generating a sequence of DAC codes corresponding to a desired shape of a stepper motor winding current waveform associated with a stepper motor position command.

* * * * *